J. McGRADY.
PLOW.
APPLICATION FILED OCT. 25, 1916.
1,251,068.
Patented Dec. 25, 1917.
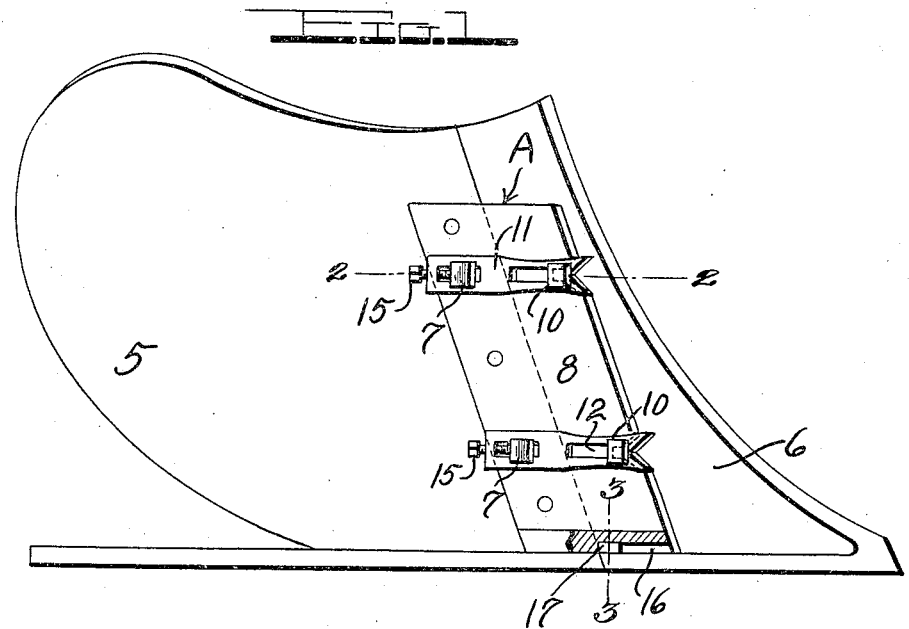
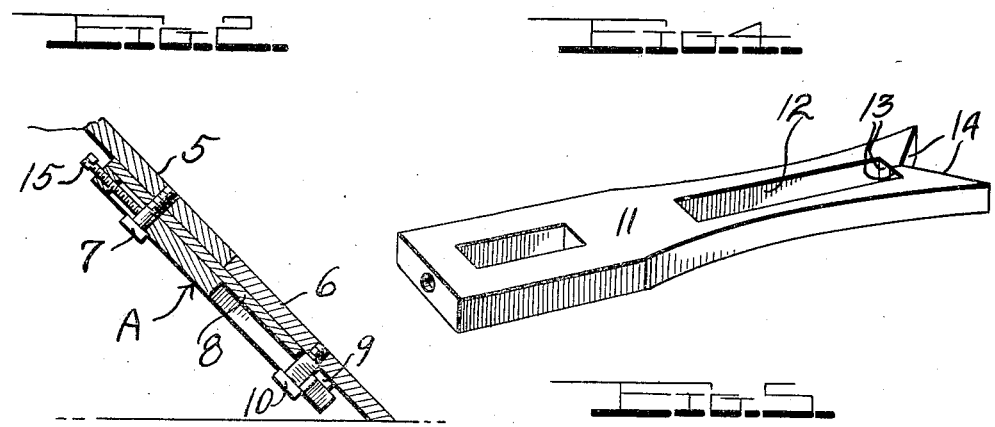
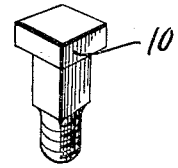
Witness
Chas. L. Griesbauer.
Inventor
JOHN McGRADY
By Knight Bros
Attorney

UNITED STATES PATENT OFFICE.

JOHN McGRADY, OF HANCOCK, MINNESOTA.

PLOW.

1,251,068.   Specification of Letters Patent.   Patented Dec. 25, 1917.

Application filed October 25, 1916. Serial No. 127,642.

*To all whom it may concern:*

Be it known that I, JOHN McGRADY, a citizen of the United States, residing at Hancock, in the county of Stevens and State of Minnesota, have invented certain new and useful Improvements in Plows, of which the following is a specification.

The present invention relates to plows, and has for its object to provide means for the ready attaching and detaching of the plow share from its mold board.

An object of the present invention is to provide a share for plows which is readily attached and removed from the mold board without the use of special tools other than an ordinary wrench, or its equivalent.

Another object is to provide a securing means for plow shares which will permit the exchange of different styles of shares.

A further object of the present invention is to provide a detachable means for securing the plow share in place which will hold the share in rigid position at all times, and also provide means whereby any play between the share and the mold board of the plow can be "taken up."

For a more detailed description of my invention, reference should now be had to the accompanying drawings, in which:—

Figure 1 is a bottom plan view of a conventional plow illustrating the application of an embodiment of my present invention;

Fig. 2 is a vertical section taken on the line 2—2 of Fig. 1;

Fig. 3 is a view similar to Fig. 2, taken on the line 3—3 of Fig. 1;

Fig. 4 is a detail perspective view of one of the attaching members and

Fig. 5 is a detail perspective view of one of the bolts which is adapted to coact with the attaching member illustrated in Fig. 4.

5 designates the mold board of a conventional plow, and 6 designates a plow share which is adapted to be secured to the mold board 5 by my improved securing means designated in general by the letter A.

Secured to the mold board 5 by means of the securing members 7, herein shown as conventional bolts, is the frog 8 which has its forward edges recessed as at 9 for the reception of the headed bolts 10 secured to the plow share 6.

The securing members 7 are adapted to also secure the attaching members 11 to the frog 8 and the mold board 5. The outer ends of the attaching members 11 are bifurcated as at 12 to provide resilient arms having at their outermost ends with shoulders 13, which have outwardly presented and inwardly inclined faces 14. By this construction, it is obvious that when the plow share 6 is placed in position upon the frog 8, a rearward movement thereof will force the bolts 10 along the inclined faces 14 until the securing members are spread sufficiently for the bolts 10 to be received within the bifurcation 12, whereupon the securing members 11 will again assume their normal position and the shoulders 13, resting against the bolt 10, will securely hold the plow share in place.

I prefer to construct the rearward end of the attaching members with the adjusting means 15, whereby any play between the plow share and mold board may be "taken up."

I also prefer to provide one end of the frog 8 with the recess 16 to receive a lug 17 secured to the plow share 6. By this construction, it is thought to be readily seen that the share 6 and the mold board 5 will at all times, be held in alinement.

When it is desired to remove the share from the plow, it is only necessary to insert a wrench or an equivalent thereof, in the bifurcation 12, in a manner to spread apart the shoulders 13 so as to release the bolts 10 and thus permit the ready removal of the share.

I claim:—

1. In a plow, the combination of a mold board having a recess, a share, and means for attaching said share to the mold board, said attaching means comprising a resilient arm carried by said mold board and adapted to embrace a part on the share and maintain it in said recess.

2. The means for securing a plow share and mold board together, comprising a frog plate secured to said mold board, and having recesses in its front edge for receiving bolts positioned upon the share, attaching means for maintaining said bolts in said recesses, said attaching means comprising resilient arms secured to the frog plate and having shoulders for embracing the bolts when in operative position.

3. The means for securing a plow share and mold board together, comprising a frog plate secured to said mold board and having recesses in its front edge for receiving bolts positioned upon the share, attaching means for maintaining said bolts in said recesses, said attaching means comprising resilient arms adjustably secured to the frog plate and having shoulders for embracing the bolts when in operative position.

4. The means for securing a plow share and mold board together, comprising a frog plate secured to the mold board and having recesses in its front edge for receiving bolts positioned upon the share, and attaching means for maintaining said bolts in said recesses, said attaching means being secured to the mold board and said frog plate, said attaching means being provided with resilient arms which embrace the said bolts.

The foregoing specification signed at Hancock, Minnesota, this fourteenth day of October, 1916.

JOHN McGRADY.

Copies of this patent may be obtained for five cents each, by addressing the "Commissioner of Patents, Washington, D. C."